3,217,033
PROCESS FOR PREPARING ORTHO SUBSTI-
TUTED BENZOIC ACID COMPOUNDS
Janos Kollonitsch, Westfield, N.J., assignor to Merck & Co., Inc., Rahway, N.J., a corporation of New Jersey
No Drawing. Filed Apr. 17, 1962, Ser. No. 188,282
4 Claims. (Cl. 260—515)

The present application is a continuation-in-part application of my copending application Serial No. 836,058 filed August 26, 1959, now abandoned.

This invention relates to a process for the preparation of ortho-alkylbenzoic acid compounds and ortho-aralkylbenzoic acid compounds having the formula:

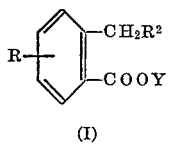

(I)

wherein $R^2$ is radical selected from the group consisting of

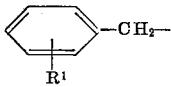

and an alkyl group, such as alkyl groups having up to 8 carbon atoms, which groups may be saturated or unsaturated, straight or branched-chain, e.g., methyl, ethyl, propyl and i-butyl; R and $R^1$ are members selected from the group consisting of hydrogen, alkyl, alkoxy, mononuclear aryl and aralkyl radicals, and Y is a member selected from the group consisting of hydrogen and an alkali metal.

The substituents R and $R^1$ can be alike or different, and one or more substituents can be attached to each ring, or any or all of the rings can be free of substituents other than the $CH_2R^2$ and COOY groups indicated as being required. Thus, R and $R^1$ can represent hydrogen, alkyl groups, such as for example lower alkyl groups having up to about 4 carbon atoms, alkoxy groups such as for example lower alkoxy groups or alkoxy groups containing up to about 4 carbon atoms, aryl radicals such as for example mononuclear aryl radicals, or arylalkyl radicals.

According to the invention, the compounds (I) are produced by contacting a compound of the formula:

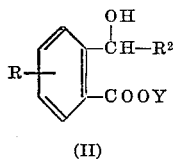

(II)

wherein R, $R^2$ and Y are as above, with hydrogen, in the presence of palladium and at a temperature and pressure and for a time sufficient to form the compounds (I).

In the practice of the invention, precursors will normally be employed as the source of the compound (II). Suitable precursors are a compound of the formula:

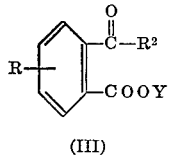

(III)

wherein R, $R^2$ and Y are as above, or a compound of the formula:

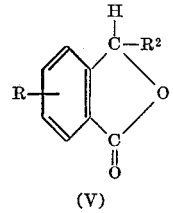

(V)

where R and $R^2$ are as above.

A mixture of these precursors can be employed, if desired.

Preferably, the precursor is a compound (III). In the case where $R_2$ is

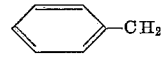

the precursor can be conveniently derived from benzalphthalide. The reaction sequence in such case is indicated by the following representation:

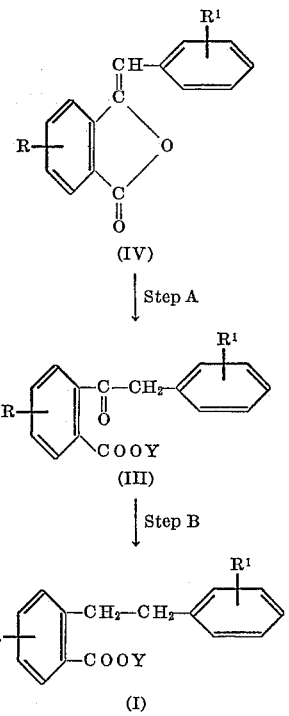

Step A involves hydrolysis and it can be carried out in a basic or acid liquid medium. A basic medium is preferred since this provides better yields and more rapid reaction.

Step B, according to the invention, is carried out by contacting the keto benzoic acid compound (III) with hydrogen in the presence of palladium as a catalyst. It is presently believed that Step B is in fact a two-step reaction in which a hydroxyphenylethylbenzoic acid compound (II) is first formed and then converted to the phenylethylbenzoic acid compound (I). This mechanism is indicated by the obtaining, according to the invention, of phenylethylbenzoic acid compounds (I) by contacting hydroxyphenylethyl benzoic acid compound (II) with hydrogen in the presence of palladium, as is more particularly discussed hereinafter. The invention, however, insofar as it provides for production of phenylethylbenzoic acid compounds (I) by contacting keto benzoic acid compounds (II) with hydrogen in the presence of palladium, is not predicted on the mechanism indicated.

The success of Step B by catalytic hydrogenation is surprising since Step B, by such means, is reported in the literature to be impossible. In this respect, reference is made to Chem. Berichte 83, 368 (1950) and Chem. Berichte 84, 671 (1951). Also, it has been found by the applicants herein that platinum is not a suitable catalyst for the hydrogenation. Thus, the reaction was unsuccessful when $PtO_2$ made by the method of Adams was employed as catalyst, since overhydrogenation occurred and 6 moles of hydrogen rather than the required 2 moles were absorbed. Inactivation of the catalyst ($PtO_2$) with triethylamine was unavailing since the product of the reduction did not contain significant amounts of the phenylethylbenzoic acid compound (I).

Means for obtaining the phenylethylbenzoic acid compounds (I) from benzalphthalide compounds (IV) other than by way of Step A and Step B are known but they are either too expensive, or hazardous or too complicated. Reference is made to the reduction of benzalphthalide compounds (I) to the phenylethylbenzoic acid compounds (I) with hydroiodic acid and phosporus, Ber. 18 3470 (1885), and also to a five step conversion Chem. Ber 84, 671 (1951).

The palladium catalyst can be in the form of metallic palladium and can be supported on a carrier such as activated carbon. A suitable catalyst composition is 10 wt. percent palladium on Darco brand activated carbon, which is marketed by the Atlas Powder Company. Other suitable supports are barium sulfate or calcium carbonate. If desired, the catalyst can be used without a support. The amount of catalyst employed is not critical and can be amounts as and commonly used in organic reactions.

The catalytic hydrogenation can be carried out in a liquid medium. Preferably a medium is employed in which the compound (III) is soluble. Water is the preferred medium and the keto acid compounds (III) are soluble therein. Other suitable media are organic solvents such as lower aliphatic alcohols, for example methanol, ethanol, and isopropanol. Alcohol-water mixtures can be used.

Further regarding the catalytic hydrogenation, reaction media in which the pH is greater than about 5 are suitable, and desirably the medium is basic so that the compound (III) is in the form of a salt, e.g. an alkali or alkaline earth or triethylamine salt. A preferred range for the pH is 8 to 11 and a pH of 8.5 has been found to be well suited for the reaction. High pH's up to 14 can be used. The basicity affects the yield of the catalytic reduction and whereas with the compound (III) in acid form yields may be about 40%, where the medium is basic so that the compounds (III) are present as salts, yields can be about 90%.

Suitable temperature for the catalytic hydrogenation are about 30 to 150 degrees C. and a preferred range is about 80 to 100 degrees C. Temperatures outside the broad range of about 30 to 150 degrees C. can be employed. Pressure is not critical and can be up to 800 p.s.i.g. or even higher. Conveniently, pressure is in the range of atmospheric to about 40 p.s.i.g.

In one embodiment of the invention the benzalphthalide compound (IV) is employed as a starting material and is saponified in a basic liquid medium to effect the reaction of Step A and provide a keto benzoic acid compound (III) as a saponification product in the medium. Step B is then carried out without separation of the keto benzoic acid compound (III) and while the medium is still basic.

A suitable procedure for steps A and B is as follows. Benzalphthalide (IV) can be saponified by heating it with aqueous sodium hydroxide. The resulting solution can be neutralized to a pH of about 8 to 10 with hydrochloric acid and any solid by-product can be filtered from the aqueous solution of the resulting sodium salt of o-phenylacetylbenzoic acid as the keto acid compound (III). Palladium on activated carbon can be added to the filtrate, and the resulting mixture can be included with hydrogen in a closed system. An initial hydrogen pressure of 40 p.s.i.g. is suitable and the system can be agitated to provide suitable gas-liquid contact. Hydrogen pressure will drop gradually until about 2 mols of hydrogen per mol of o-phenylacetylbenzoic acid are absorbed, and pressure drop will cease. At this time, the reaction is complete. The medium can then be cooled to room temperature and the product worked up by separating the catalyst by filtration and acidifying the filtrate to precipitate the compound (I) as o-(2-phenylethyl) benzoic acid and as a crystalline product.

When compounds (V) are employed as precursors, the steps involved are indicated by the following representation:

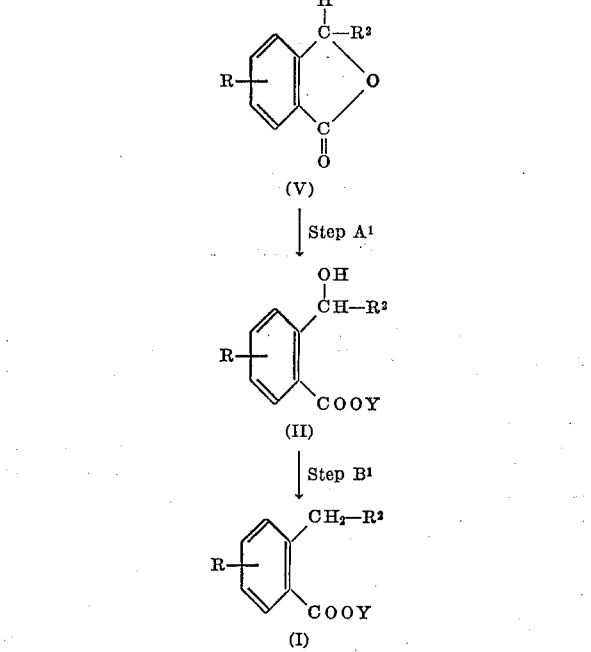

Step $A^1$ is a hydrolysis reaction and can be effected in an acid or basic medium. A strongly basic medium is preferred. The pH can be in the range of about 7–14 and a preferred range is about 10–12. A liquid medium can be employed and an aqueous medium is preferred.

Step $B^1$ can be carried out under the conditions described above for Step B, and all of the limitations described above with respect to Step B apply to Step $B^1$. Hydrogen is contacted with the compound (II) in the presence of palladium in media described above and at temperature conditions described for Step B.

The invention is further described in the following examples:

EXAMPLE 1

Benzalphthalide 22.2 of benzalphthalide (0.1 mole) was mixed with a 5 g. NaOH (about 0.125 mole) in 100 ml. water and stirred at 90–95 degrees C. for 20 minutes. Except for a little crystalline by-product, it was a clear, yellow solution. To the solution was added 50 ml. water and after cooling to room temperature the excess NaOH was neutralized with about 2 ml. conc. HCl. The resulting solution was slightly alkaline to phenolphthalein (about pH 8.5). The yellow by-product of the reaction was filtered off (0.55 g., M.P. 140–145 deg. C.), water with 2 x 5 ml. water and the filtrate diluted to 170 ml. with water. After adding 2 g. Pd on Darco (10% Pd) it was hydrogenated at 80 degrees C., starting pressure 40 lbs. p.s.i.g. After 8 hrs.

0.2 mol H₂ was taken up and the uptake practically ceased.

After cooling to room temperature, it was filtered from the catalyst, the catalyst washed with 2 x 20 ml. of water and 2 x 10 ml. of 4% NaOH solution. The combined filtrates were then acidified with conc. HCl to Congo red (about 10 ml. was needed) to give a white crystalline precipitate of o-(2-phenylethyl) benzoic acid. It was filtered, washed thoroughly with water (5 x 20 ml.) and dried in air at 80 deg. C. Yield, 20.71 g. (91.6%); M.P. (125 deg.) 126–129 deg. C. Mixed M.P. with authentic material showed no depression.

EXAMPLE 2

3-benzylphthalide

To a solution of 5 g. (0.125 F.W.) of sodium hydroxide in 150 ml. of water was added 22.4 g. (0.1 mole) of 3-benzylphthalide. This suspension was stirred and boiled until solution was complete. The basicity of the solution was adjusted and a buffer added. To do this, in the hot solution was dissolved 14.2 g. (0.1 F.W.) of sodium phosphate dibasic anhydrous. To this solution, which was still strongly alkaline, was added 1.1 ml. of 85% phosphoric acid which rendered the solution weakly alkaline and caused the separation of an oil. The mixture including the oil was diluted to about 180 ml. and 3.5 g. of 5% palladium on Darco catalyst was added. The mixture was then shaken under hydrogen at 40 p.s.i.g. at 120 deg. C. for eight hours. The reaction mixture was cooled and filtered. When the filtrate was made strongly acidic the product separated as colorless needles. After aging in an ice bath the crystals were collected, washed with weakly acidic water, and air dried to constant weight. The o-(2-phenethyl) benzoic acid so prepared weighed 19.7 g. (87% theory) and melted at 125–127.5 deg.

EXAMPLE 3

Mixture of benzalphthalide and benzylphthalide

To a solution of 5 g. (0.125 F.W.) of sodium hydroxide in 150 ml. of water was added 11.1 g. (0.05 mole) of benzalphthalide. The mixture was stirred and boiled until all the organic material dissolved. In a similar manner was then dissolved 9.2 g. (0.041 mole) of 3-benzylphthalide. The solution was then buffered with 14.2 (0.1 F.W.) of dibasic sodium phosphate anhydrous and adjusted to weakly basic by the addition of 1.1 ml. of 85% phosphoric acid. Some oil separated. The mixture including the oil was diluted to about 180 ml., and an additional 2.0 g. (0.009 mole) of 3-benzylphthalide was added. After the addition of 3.5 g. of 5% palladium on Darco catalyst, the mixture was hydrogenated and worked up as described in Example 2 to obtain 21.5 g. (95.3% theory) of 2-phenethylbenzoic acid, M.P. 127.5–131.5 deg.

EXAMPLE 4

2-ethyl-benzoic acid

Ortho-acetylbenzoic acid (16.4 grams, 0.100 mol) was dissolved in a mixture of 100 ml. of 0.1 N sodium hydroxide solution and 70 ml. of water (pH 7). It was hydrogenated after the addition of 10 grams of Dacro catalyst (10% Pd) at 40 pounds per square inch starting pressure. After the uptake of 0.1 mole of hydrogen in 2 hours further absorption ceased. The temperature was raised to 80° C. and hydrogenation continued for 6 hours at 40 p.s.i. until another 0.1 mol of hydrogen was consumed. Following filtration through kieselguhr and acidification with hydrochloric acid, 12.4 grams of 2-ethyl-benzoic acid was obtained (83% yield, M.P. 62–63° C.)

Analysis—Calcd. for $C_9H_{10}O_2$: C, 71.9; H, 6.75. Found: C, 72.02; H, 6.95.

Equivalent weight (by titration) 149; theory, 150.08.

The foregoing illustrates the practice of this invention which, however, is not to be limited thereby but is to be construed as broadly as permissible in view of the prior art and limited solely by the appended claims.

What is claimed is:

1. The process of producing 2-ethyl-benzoic acid, which comprises contacting a compound selected from the group consisting of ortho-acetyl benzoic acid and alkali metal salts thereof with hydrogen in the presence of palladium at a temperature within the range from about 80° C., to about 100° C., and a pH higher than about 5.

2. The process of claim 1, wherein said contacting is carried out in a basic liquid medium.

3. The process of producing 2-phenylethylbenzoic acid, which comprises contacting a compound selected from the group consisting of ortho-(2-phenylacetyl)-benzoic acid and alkali metal salts thereof with hydrogen in the presence of palladium at a temperature within the range from about 80° C. to about 100° C. and a pH higher than about 5.

4. The process of claim 3, wherein said contacting is carried out in a basic liquid medium.

References Cited by the Examiner

UNITED STATES PATENTS 2,078,230    4/37    Bousquet et al. _____ 260—515

OTHER REFERENCES

Elsner et al.: "J. Chem. Soc. (London)" (1957), pages 578–582.

Riemschneider et al.: "Ber. Deut. Chem." 92, pages 1705–1709, July 1959.

Treibs et al.: "Ber. Deut. Chem.," volume 84, pages 671–679 (1951).

LORRAINE A. WEINBERGER, *Primary Examiner.*

CHARLES B. PARKER, *Examiner.*